US011046012B2

(12) United States Patent
Bruggeman et al.

(10) Patent No.: US 11,046,012 B2
(45) Date of Patent: Jun. 29, 2021

(54) THREE-DIMENSIONAL MODELING METHOD AND SYSTEM

(71) Applicant: BOND HIGH PERFORMANCE 3D TECHNOLOGY B.V., Enschede (NL)

(72) Inventors: Thomas Jonathan Bruggeman, Enschede (NL); Adrianus Bruggeman, Enschede (NL); Martijn Johannes Wolbers, Enschede (NL); Kevin Hendrik Jozef Voss, Enschede (NL); Bouwe Kuiper, Enschede (NL); Koendert Hendrik Kuit, Enschede (NL); Marald Speelman, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 0 days.

(21) Appl. No.: 16/604,598

(22) PCT Filed: Apr. 16, 2018

(86) PCT No.: PCT/EP2018/059679
§ 371 (c)(1),
(2) Date: Oct. 11, 2019

(87) PCT Pub. No.: WO2018/189406
PCT Pub. Date: Oct. 18, 2018

(65) Prior Publication Data
US 2020/0376768 A1     Dec. 3, 2020

(30) Foreign Application Priority Data
Apr. 14, 2017   (NL) ..................................... 2018720

(51) Int. Cl.
*B29C 64/393*     (2017.01)
*B29C 64/106*     (2017.01)
(Continued)

(52) U.S. Cl.
CPC .......... *B29C 64/393* (2017.08); *B29C 64/106* (2017.08); *B29C 64/209* (2017.08);
(Continued)

(58) Field of Classification Search
CPC ..... B29C 64/393; B29C 64/106; B29C 64/35; B29C 64/209; B29C 2945/76013;
(Continued)

(56) References Cited

U.S. PATENT DOCUMENTS

2001/5097308         4/2015   Batchelder et al.
2015/0298394  A1 *  10/2015   Sheinman ............. B29C 64/364
                                                                427/402
(Continued)

FOREIGN PATENT DOCUMENTS

CN      106493945 A      3/2017
WO      2016009426 A1    1/2016
WO      2016082036 A1    6/2016

OTHER PUBLICATIONS

Japanese Office Action dated Apr. 7, 2020 for family member Application No. 2019-555758.

*Primary Examiner* — Nahida Sultana
(74) *Attorney, Agent, or Firm* — Hudak, Shunk & Farine Co. LPA

(57) ABSTRACT

A method for generating a signal indicative for nozzle maintenance, including feeding modeling material through a feed channel of a printhead to a nozzle of the printhead in a three-dimensional modeling system, determining a parameter indicative of a fluid resistance of modeling material within the nozzle. Determining the parameter includes determining a flowrate of the modeling material within the feed channel, determining a pressure exerted on the modeling material within the feed channel and determining a pressure exerted on the modeling material outside the feed channel, determining a pressure difference between the pressure
(Continued)

exerted on the modeling material within the feed channel and the pressure exerted on the modeling material outside the feed channel, and calculating the parameter from the determined flow rate and the determined pressure difference. A method and system for three-dimensionally modeling a three-dimensional object using the method for generating a signal indicative for nozzle maintenance.

20 Claims, 4 Drawing Sheets

(51) Int. Cl.
B33Y 50/02 (2015.01)
B29C 64/209 (2017.01)
B29C 64/35 (2017.01)

(52) U.S. Cl.
CPC .............. *B29C 64/35* (2017.08); *B33Y 50/02* (2014.12); *B29C 2945/7602* (2013.01); *B29C 2945/76006* (2013.01); *B29C 2945/76013* (2013.01)

(58) Field of Classification Search
CPC .. B29C 2945/76006; B29C 2945/7602; B33Y 50/02
See application file for complete search history.

(56) References Cited

U.S. PATENT DOCUMENTS

| | | | |
|---|---|---|---|
| 2017/0129186 A1* | 5/2017 | Sauti | B33Y 50/02 |
| 2018/0154573 A1* | 6/2018 | Miles | B29C 64/118 |
| 2018/0345563 A1* | 12/2018 | Sterna | B29C 48/92 |
| 2019/0001574 A1* | 1/2019 | Yackabonis | G06F 3/1206 |
| 2019/0118258 A1* | 4/2019 | Sachs | B29C 64/393 |
| 2020/0238566 A1* | 7/2020 | Lin | B23K 15/08 |
| 2020/0238680 A1* | 7/2020 | Kroes | B29C 64/118 |
| 2020/0262148 A1* | 8/2020 | Sebal | B05B 7/228 |
| 2020/0338824 A1* | 10/2020 | Cardon | B29C 48/397 |
| 2020/0368970 A1* | 11/2020 | Georgeson | B33Y 50/02 |

* cited by examiner

THREE-DIMENSIONAL MODELING METHOD AND SYSTEM

FIELD OF THE INVENTION

The invention relates to a three-dimensional modeling system for creating a three-dimensional object, and a method of three-dimensional modeling a three-dimensional object.

BACKGROUND OF THE INVENTION

In three-dimensional modeling objects are formed by layering modeling material in a controlled manner such that a desired three-dimensional shaped object can be created. This way of forming objects can also be referred to as additive manufacturing. Very often for three-dimensional modeling a three-dimensional modeling printer is used. The printer has a three-dimensionally moveable printhead which dispenses the modeling material, while the printhead is moved over previously deposited tracks of the modeling material.

The object to be printed can be placed on a base. The printhead is movable in a three-dimensional space relative to the object being modeled or printed or vice versa. In some cases, the object is movable in one or more dimensions relative to the printhead. Various combinations are possible for moving the object on which the object is modeled relative to the printhead and vice versa.

The motions of the printhead are controlled by a control system which controls in a 3-dimensionally controllable positioning system to which the printhead is attached. By means of software a pattern of tracks can be designed, which pattern is used for moving the printhead and for depositing the tracks.

The object is created on a base structure in a reference location relative to the movable printhead. The modeling material can be fused with previously formed tracks. The three-dimensional modeling material can be fed in the printhead in the form of for example filaments, granulate, rods, liquid or a suspension. The printhead dispenses the modeling material from the printhead through a nozzle and deposits it on the base in the form of tracks forming a layer of tracks, or when a previous layer of the object to be created has been deposited, on the object on previously deposited tracks where it is allowed to solidify. The modeling material can be thermally or chemically or otherwise fused with the previously deposited tracks. The modeling material can be dispensed from the printhead and deposited on the previously deposited tracks and cured to solidify after the deposition.

The relative motion of the base and object to the printhead in tracks and simultaneous deposition of modeling material from the printhead allow the fused deposition modeled object to grow with each deposited track and gradually attains its desired shape.

In current material extrusion printers (including granulate extruders, ram extruders and syringe extruders), the modeling material is deposited in a feed forward, flow-controlled way. The flow rate of the modeling material is kept constant, depending on thickness of the tracks to be deposited and the print speed. As part of the machine calibration, the material flow is calibrated.

Moreover, the modeling material can be deposited using pressure-controlled printing, wherein the pressure within a feed channel of the printhead is controlled, and/or wherein the pressure within the modeling material at the nozzle tip of the printhead can be controlled for example to prevent over- or under extrusion of the modeling material.

The modeling material within the feed channel of the printhead may decay while printing. This may be due to for example impurities within the modeling material, or ingress of dust or other particles from the environment wherein the three-dimensional printer is located, or other sources. For fusible material which is melted prior to depositing via the nozzle of a printhead, in order for it to be printable, there is a risk of decomposition or disintegration if the material is kept at a high range near the melting temperature too long.

This may give rise to formation of solid particles of disintegrated modeling material. In depositing for example curable resins, also contaminants within the modeling material, and/or dead spots within the feed channel may eventually give rise to formation of solid particles. This applies especially for the printhead nozzle which is usually kept at the highest temperature within the printhead. Near the feed channel wall, especially near the nozzle, the modeling material flow rate is lowest. As a consequence, undesired solidification and disintegration is usually initiated in this region.

While depositing the modeling material, debris or solid particles in the printhead feed channel and nozzle may cause clogging of the feed channel or nozzle and can lead to reflow of material inside the print tube, causing jamming of the extruder.

Alternatively, the nozzle opening can wear out and dilate, resulting in a larger width of printed tracks and less accurate part dimensions. Moreover, the pressure of the extruded material from the nozzle will be higher, potentially resulting in over-extrusion of the layer being deposited on the previous layer. This may result in excessive forces between the object and the printhead and in a rough surface of the created object due to overflow of the modeling material. The overflow of modeling material may further lead to debris or residue on the nozzle tip of the printhead which may come off the nozzle tip and fuse with the object being printed and cause potential loss of the object.

SUMMARY OF THE INVENTION

It is therefore an object of the invention to provide a method and system for three-dimensional modeling which overcomes the problems and disadvantages of the prior art as set out above.

The object is achieved in a method for generating a signal indicative for nozzle maintenance, comprising feeding modeling material using feeding means through a feed channel of a printhead to a nozzle of the printhead in a three-dimensional modeling system, determining a parameter indicative of a fluid resistance of modeling material within said nozzle.

The determining said parameter comprises determining a flowrate of the modeling material within the feed channel, determining a pressure exerted on the modeling material within the feed channel and determining a pressure exerted on the modeling material outside the feed channel, determining a pressure difference between the pressure exerted on the modeling material within the feed channel and the pressure exerted on the modeling material outside the feed channel, and calculating said parameter from the determined flow rate and the determined pressure difference.

The method further comprises comparing said parameter with a predetermined range and generating said signal if said parameter is out of the predetermined range.

This allows a user to be made aware of the parameter indicative of a fluid resistance of modeling material within a nozzle being out of range, i.e. a control system of the three-dimensional modeling system wherein the method is performed to initiate appropriate action for nozzle maintenance.

The fluid resistance may be determined by the ratio of the pressure difference and the flow rate. As an alternative for fluid resistance, the skilled person will know that also a fluid conductance may be determined as is the inverse of fluid resistance.

In an embodiment, the comparing the parameter with a predetermined range comprises comparing the parameter with a first predetermined threshold value, and the generating said signal if the parameter indicative of the fluid resistance is out of the predetermined range comprises generating a first signal if the parameter is greater than or equal to the first predetermined threshold value.

This allows the signaling of a resistance too high, which may be caused for example by clogging or fouling of the nozzle.

In an embodiment, the comparing the parameter with a predetermined range comprises comparing the parameter to a second predetermined threshold value, and the generating said signal if the parameter indicative of the fluid resistance is out of the predetermined range comprises generating a second signal if the parameter is less than or equal to the second predetermined threshold value.

This allows the signaling of a too low resistance, which may be caused for example by dilation of the nozzle outlet caused by wear.

In an embodiment, the determining a pressure exerted on the modeling material within the feed channel comprises using a first pressure sensor for determining a pressure exerted by the feeding means on the modeling material.

As determining a pressure exerted directly on the modeling material, the pressure may be determined by for example a sensor at the tip of a plunger by which the modeling material is pushed through the feed channel. Alternatively, a force sensor can be attached to such a plunger, i.e. a strain gauge, from which the pressure exerted on the modeling material can be derived.

In an embodiment, the determining a pressure exerted on the modeling material within the feed channel comprises using a second pressure sensor connected to the feed channel near the nozzle.

A fluid pressure sensor can be utilized having a fluid connection with the feed channel section. This may apply to printers using fusible material which pressure within the feed channel in molten state can be measured. Furthermore, liquid modeling materials can be used whereby the pressure within the feed channel can be measured using a pressure sensor.

Furthermore, the drive force of a drive within the feeding means may be stablished such as for example a drive current of an electric motor driving the feeding means.

In an embodiment, the feeding means comprise a rotary drive, an actuator and a transmission system for transferring a drive force between the rotary drive and the actuator, wherein the determining a pressure exerted on the modeling material within the feed channel comprises, measuring a drive force in one of the drive and transmission system.

The actuator can for example be a plunger which can be arranged to push rods of modeling material through the feed channel.

The actuator can also be a drive wheel which is arranged to push modeling material filament through the feed channel by grip or friction.

In an embodiment, the drive force can be measured using a torque sensor connected to one of the rotary drive and the transmission system and the actuator.

In an alternative embodiment, the rotary drive comprises an electric motor, wherein the drive force can be measured by measuring a current supplied to the electric motor.

The current supplied to the electric motor is proportional to the motor torque is thereby proportional to the pressure exerted on the modeling material without requiring a mechanical sensor.

In an embodiment, the determining a pressure exerted on the modeling material outside the feed channel comprises: assigning an atmospheric pressure value to the pressure exerted on the modeling material outside the feed channel.

In this case the pressure exerted on the modeling material outside the feed channel, i.e. outside the nozzle, can be assumed to be the atmospheric pressure. When working with pressures relative to the atmospheric pressure, the pressure outside the feed channel can be assumed to be equal to zero.

In an embodiment, measuring a pressure exerted on the modeling material outside the feed channel comprises determining a pressure exerted on the modeling material at a tip of the nozzle. The modeling material during deposition on the object to be created flows out of an outlet opening of the nozzle at the tip of the nozzle. During deposition the modeling material is usually still in a liquid state. Beyond the nozzle tip, the modeling material will solidify, cure, or harden. Thus, at the nozzle tip the pressure within the modeling material is representative of the pressure outside the feed channel. This allows precise determination of the pressure difference within modeling material inside and outside the feed channel.

In an embodiment, the determining a pressure exerted on the modeling material at a tip of the nozzle comprises measuring a force between the nozzle tip and a base for placing an object to be modeled.

To determine the pressure at the nozzle tip, a force may be measured between the three-dimensional object to be created and the nozzle tip. As it is not possible to measure this force directly in the liquid, not yet solidified modeling material, the force may be measured anywhere in the path between the base on which the object rests and the nozzle tip. The pressure in the modeling material at the nozzle tip is directly proportional to the measured force.

In an embodiment, the measuring a force between the nozzle and a base for placing the object to be modeled comprises using a force sensor in at least one location from the group of locations comprising: a connection between the printhead and a three-dimensional positioning system for positioning the printhead relative to the base, a connection of the base to the three-dimensional positioning system, a location between the base and ground, and a location between the base and the object to be printed.

In an embodiment, the determining a flow rate of the modeling material within the feed channel comprises determining a displacement of the modeling material within the feed channel. The modeling material is pushed through the feed channel while depositing it on the three-dimensional object to be created. The displaced amount of material per time unit determines the flow rate of the modeling material. This displaced amount of modeling material can be determined regardless if the modeling material is in a solid state or in a liquid state.

In an embodiment, the determining a displacement of the modeling material within the feed channel comprises determining a displacement of the feeding means for feeding the modeling material through the feed channel. The displacement can for example be measured by sensing the displacement of an actuator which is arranged to push the modeling material through the feed channel. Alternatively, the displacement can be measured by sensing displacement of a drive motor driving the actuator.

In an embodiment, the method further comprises initiating a sequence for replacing at least one of the nozzle and the printhead upon generating said signal indicative for nozzle maintenance.

The object is further achieved according to another aspect of the invention in a method of purging a printhead in a three-dimensional modeling system in a method of three-dimensionally modeling a three-dimensional object, comprising:

moving the printhead to a purge location;
purging a feed channel of the printhead;
performing the steps of the method for generating a signal indicative for nozzle maintenance as described above.

This allow the generating the signal indicative for nozzle maintenance while purging the printhead feed channel. The skilled person will understand that while purging the feed channel, also the nozzle may be purged from modeling material.

In an embodiment, the purge location is within a build chamber of the three-dimensional modeling system.

This allows a fast and efficient way of purging the printhead feed channel without a need to move the printhead to another location. Thus, operating conditions such as temperature may be preserved.

The object is further achieved according to another aspect of the invention in a method for three-dimensionally modeling a three-dimensional object comprising:

three-dimensionally positioning a printhead connected to a three-dimensional positioning system of a three-dimensional modeling system;
depositing modeling material using the printhead;
performing the steps of the method for generating a signal indicative for nozzle maintenance as described above.

This allows the determination whether nozzle maintenance is required while live performing the modeling of an object. This allows the feed channel and therewith the nozzle to be cleaned for further use. Should this not lead to a fluid resistance low enough for proper operation of the printhead, the control system may be arranged in a further embodiment to generate a further signal and/or initiate a sequence for replacing at least one of the nozzle and printhead. This can also be performed when the fluid resistance is too low, due to for example dilation by wear of the nozzle outlet. Thus, the nozzle and/or printhead may be replaced.

In an embodiment, the method further comprises controlling at least one of feeding of the modeling material within the printhead and positioning of the printhead depending on at least one of the pressure exerted on the modeling material within the feed channel, the pressure exerted on the modeling material outside the feed channel and the flow rate of the modeling material within the feed channel, and adapting the controlling of at least one of the feeding of the modeling material within the printhead and positioning of the printhead in accordance with the parameter indicative of the fluid resistance of the modeling material within the nozzle of the printhead.

This advantageously allows the generating a signal indicative of nozzle maintenance while performing pressure-controlled deposition of modeling material to build a three-dimensional object, using the determined pressure exerted on the modeling material within and outside of the feed channel.

The object is also achieved in a system for three-dimensionally modeling a three-dimensional object, comprising a three-dimensional positioning system, a three-dimensional modeling printhead connected to the three-dimensional positioning system, feeding means for feeding modeling material through a feed channel of the printhead to a nozzle, means for determining a parameter indicative of a fluid resistance of modeling material within a nozzle of the three-dimensional modeling printhead, wherein the means for determining a fluid resistance of the modeling material within the nozzle comprise: flow determining means for determining a flowrate of the modeling material within the feed channel; first pressure determining means for determining a pressure exerted on the modeling material within the feed channel and second pressure determining means for determining a pressure exerted on the modeling material outside the feed channel; processing means, wherein the processing means are configured and arranged for: determining a pressure difference between the pressure exerted on the modeling material within the feed channel and the pressure exerted on the modeling material outside the feed channel; calculating the parameter indicative of the fluid resistance of the modeling material from the determined flow rate and the determined pressure difference; the system further comprises a comparator for comparing said parameter with a predetermined range, and a generator for generating a signal indicative for nozzle maintenance if the parameter indicative of the fluid resistance is out of the predetermined range.

The parameter indicative of a fluid resistance of modeling material within a nozzle of the three-dimensional modeling printhead can be determined from a ratio between a pressure difference over the nozzle and a flow rate of modeling material through the nozzle. When this parameter is out of range, the comparator enables said signal indicative for nozzle maintenance to be generated and further action to be initiated for maintenance of the nozzle and/or printhead.

In an embodiment, the comparator is arranged for comparing the parameter with a first predetermined threshold value; and the generator is arranged for generating a first signal if the parameter is greater than or equal to the first predetermined threshold value.

In an embodiment, the comparator is arranged for comparing the parameter to a second predetermined threshold value, and the generator is arranged for generating a second signal if the parameter is less than or equal to the second predetermined threshold value.

In an embodiment, the first pressure determining means comprises a first pressure sensor for determining a pressure exerted by the feeding means on the modeling material.

In an embodiment, the first pressure determining means comprise a second pressure sensor connected to the feed channel near the nozzle.

In an embodiment, the feeding means comprise a rotary drive, an actuator and a transmission system for transferring a drive force between the rotary drive and the actuator, and wherein the first pressure determining means for determining a pressure exerted on the modeling material within the feed channel comprises means for measuring a drive force in one of the drive and transmission system.

In an embodiment, the means for measuring a drive force in one of the drive and transmission system comprise a torque sensor configured and arranged between any one of the rotary drive and the transmission system and the actuator.

In an embodiment, the rotary drive comprises an electric motor, and wherein the means for measuring a drive force in one of the drive and transmission system comprise a current sensor for measuring a current supplied to the electric motor.

In an embodiment, said second pressure determining means comprise means for assigning an atmospheric pressure value to said pressure exerted on the modeling material outside the feed channel.

In an embodiment, the second pressure determining means comprise a third pressure sensor for determining a pressure exerted on the modeling material at a tip of the nozzle.

In an embodiment, the third pressure determining means comprises a force sensor arranged between the nozzle and a base for placing the three-dimensional object to be modeled. The pressure exerted on the modeling material outside the feed channel is directly proportional to the force exerted on the modeling material outside the nozzle, at the nozzle tip.

In an embodiment, the force sensor is arranged in at least one location from a group of locations comprising: a connection between the printhead and the positioning system for positioning the printhead relative to the base, a connection of the base to the positioning system, a location between the base and ground, and a location between the base and the object to be printed.

In an embodiment, the flow determining means are arranged for determining a displacement of the modeling material within the feed channel.

In an embodiment, the flow determining means comprise a displacement sensor connected to the feeding means for feeding the modeling material through the feed channel.

In an embodiment, the system further comprises a purge location, and positioning means that are configured and arranged for moving the three-dimensional modeling printhead to said purge location if the parameter is greater than or equal to the first predetermined threshold value, and the printhead is arranged for purging the feed channel.

In an embodiment, the system further comprises a built chamber in which the three-dimensional object to be created can be accommodated, wherein the purge location is configured and arranged within the built chamber.

In an embodiment, the positioning means are arranged for initiating a sequence for replacing at least one of the nozzle and the printhead upon generating said signal indicative for nozzle maintenance.

In an embodiment, the system further comprises a control system, wherein the control system is configured and arranged for controlling at least one of the feeding means and positioning means depending on at least one of the pressure exerted on the modeling material within the feed channel, the pressure exerted on the modeling material outside the feed channel and the flow rate of the modeling material within the feed channel, and adapting the controlling of at least one of the feeding means and positioning means in accordance with the parameter indicative of the fluid resistance of the modeling material within the nozzle of the three-dimensional modeling printhead.

DETAILED DESCRIPTION OF EMBODIMENTS

Figure 1A:
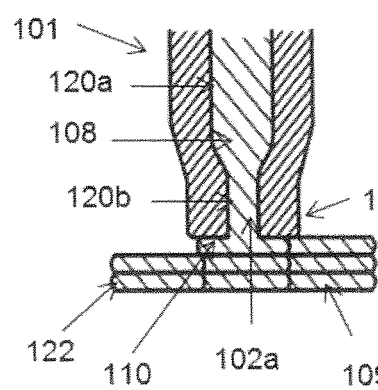
FIGS. 1a-1c show nozzles for a system for three-dimensional modeling according to the state of the art.
Figure 3:
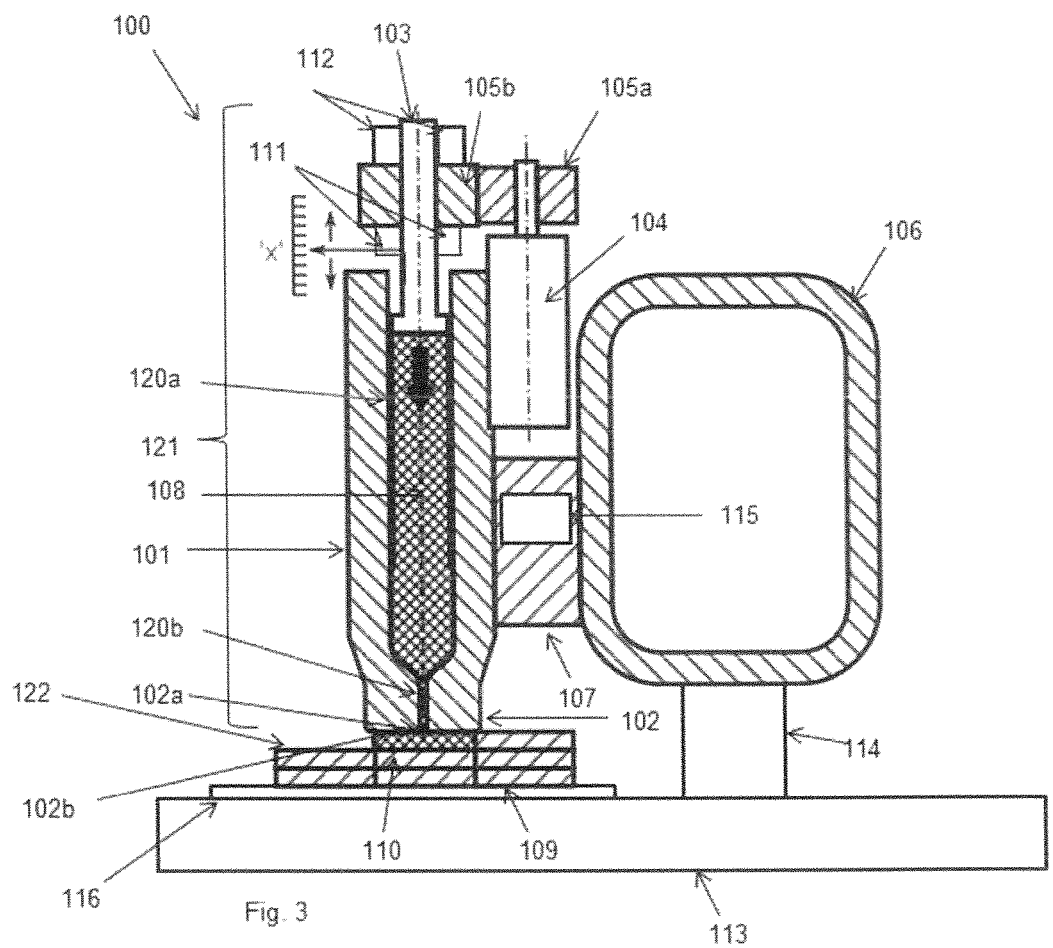
FIG. 3 shows a diagram of a system for a three-dimensional modeling according to the invention.

In FIG. 1a a tubular feed member 101 is shown for use in a printhead for a three-dimensional modeling system as will be further described in relation to FIG. 3. The tubular feed member 101 is arranged for receiving modeling material 108, which can be pushed to the nozzle 102. The inside of the tubular feed member 101 forms an upper feed channel 120a and nozzle section of the feed channel 120b. The feed channel part 120b at the nozzle 102 is prone to clogging and fouling due to contamination or decomposition of the modeling material, or contamination while introducing and pushing the modeling material into the tubular feed member 101.

Figure 1B:
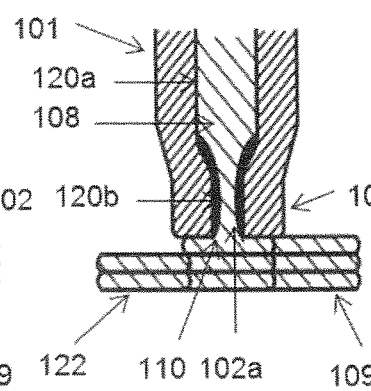

In FIG. 1b, fouling (dark parts) within the feed channel 102b in the nozzle 102 is shown, Debris may accumulate near the nozzle outlet 102a where the modeling material flow rate is lowest. The modeling material may experience a high fluid resistance when passing through the clogged or fouled feed channel 120b and/or nozzle outlet 102a.

Figure 1C:
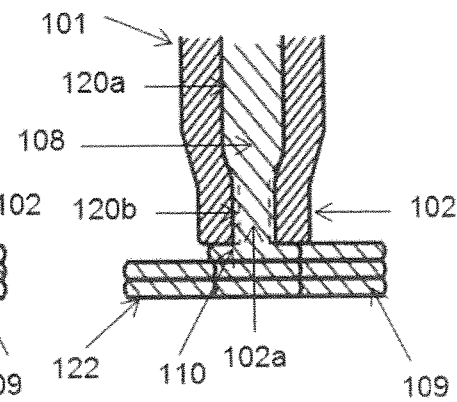

In FIG. 1c, the nozzle outlet 102a is shown dilated (dashed lines) which may occur after prolonged use due to wear. The modeling material is pushed at high pressure through the upper feed channel 120a and nozzle section of the feed channel 120b towards the nozzle 102, where it must pass through the narrow nozzle outlet 102a. Thus, the feed channel 120b, and nozzle outlet 102a may wear out in time causing a low fluid resistance for the modeling material passing through.

Figures 2A, 2B:
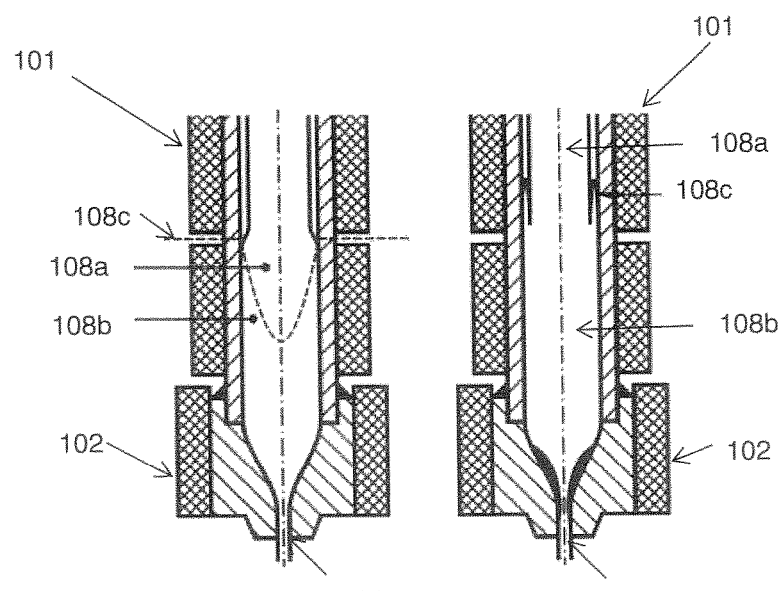
FIGS. 2a-2b show nozzles for a system for three-dimensional modeling according to the state of the art.

In FIG. 2a a tubular feed member 101 is shown for fused deposition modeling wherein initially modeling material 108a in a solid state is fed to the nozzle 102, wherein the modeling material 108b will be in a molten state up to level 108c when heated, under normal circumstances.

In FIG. 2b, the tubular feed member 101 is shown having fouling near the nozzle outlet 102a which due to its high fluid resistance causes the level 108c to creep up to higher levels within the tubular feed member 101, i.e. the upper feed channel 120a.

In FIG. 3 a system for three-dimensional modeling 100 is shown in a simplified form. The system 100 comprises a modeling printhead 121 attached via a connection bar 107 to a gantry 106, which gantry 106 is comprised in a X-Y-Z positioning system 114, which allows the printhead 121 and three-dimensional object 122 positioned at base 113 to be printed to be moved relatively to one another while depositing layers 110 of modeling material. The skilled person will understand that various ways are available for moving the printhead 121 and three-dimensional object 122 or base 113 relative to one another.

The printhead 121 comprises the tubular feed member 101 as described, which acts as an extruder tube, and which is arranged for feeding modeling material 108 from one end of the tubular feed member 101 towards a nozzle 102 connected at the opposite end of the tubular feed member 101. The tubular feed member 101 can for example be made from a metal, such as stainless steel.

The feed channel section 120b at the nozzle 102 leads to the nozzle outlet 102a at the nozzle tip 102b. During printing, the nozzle tip 102b is in contact with the modeling material being deposited 110.

The three-dimensional modeling material 108 may include thermoplastic polymers such as for example polylactic acid (PLA), acrylonitrile butadiene styrene (ABS), polycarbonate (PC) and polyether ether ketone (PEEK). These materials can be melted within the tubular feed member 101 and dispensed from the nozzle 102 in subsequent tracks 109, 110, for forming a three-dimensional object 122 to be created.

The tubular feed member 101 and also the nozzle 102 can be provided with one or more heating elements, which can be arranged around or near the tubular feed member 101, to heat and melt modeling material feedstock in order to allow the printhead to deposit and fuse modeling material in a molten state.

Other materials for three-dimensional modeling may include pastes, suspensions or resins, which can be deposited in thin tracks and cured for example by exposure to ultraviolet light, air, heat, or other curing agents.

The modeling material 108 is deposited on a base 113 in a first track, i.e. previously deposited tracks 109 on base 113 and on subsequent tracks 110 in successive deposition operations conducted by the X-Y-Z positioning system 114. The base 113 can be a base plate, ground or any other structure suitable for initiating the deposition of tracks and building and carrying the object to be printed. The base 113 can be fixed or movable. In some cases, the base 113 can be movable in a horizontal X-Y direction, whereas the printhead 121 is movable in a vertical Z-direction. In other cases, the base 113 can be movable in X-Y-Z horizontal and vertical direction relative to the printhead 121. In again other cases, the printhead 121 is movable in X-Y-Z horizontal and vertical direction relative to the base 113. In this description the latter case is provided by way of example.

While the printhead 121 is moved over the previously deposited tracks 109, a drive system comprising a drive 104, a transmission gear 105a, 105b for transmitting the rotary motion of the drive 104 to a longitudinal motion of a plunger 103, which pushes the modeling material within the upper feed channel 120a of the tubular feed member 101 towards the nozzle section of the feed channel 120b and the nozzle 102. The rotation-to-translation transmission 105a, 105b, 103 can be a spindle transmission, of which a nut which is part of the transmission gear 105a, 105b is driven via by the rotary drive 104. The pressure exerted on the modeling material 108 by the rotation-to-translation transmission can be derived from the determined torque using the transfer ratio of the angular displacement of the motor axle and the longitudinal displacement of the plunger 103 attached to a spindle of the rotation-to-translation transmission 105a, 105b, 103. The rotary drive 104 can be a stepper motor which can be controlled digitally to proceed a discreet number of steps in a chosen direction.

The rotary drive 104 can also be an electric motor, DC or AC, or servomotor, which is controllable by voltage and/or current supplied to the motor. In the latter case, an encoder connected to the motor axle may provide position information of the motor. A person skilled in the art will understand that also another type of linear actuator could be applied.

The plunger 103 can be provided with a displacement sensor 111, which can be arranged to measure a displacement X of the plunger 103 relative to the tubular feed member 101. FIG. 3 shows as an example feeding modeling material 108 in the form of rods in the tubular feed member 101 to the nozzle 102. In the art alternative examples of feeding modeling material to the nozzle 102 are available, such as feeding modeling material filament into a tubular feed member 101 using for example filament punch rollers, which can be driven by an electric motor. The deposition of tracks 110 on top of previously deposited tracks 109 performed in similar ways using a X-Y-Z positioning system 114 whilst the modeling material filament is fed into the tubular feed member 101.

The system 100 according to FIG. 3, can be controlled by a control system which is arranged to control the printhead 121, i.e. the rotary drive 104 to dispense three-dimensional modeling material at a rate proportional to a required track thickness and printing speed. In order to achieve this, a predetermined flow rate of the modeling material 108 is to be achieved. The control system controls the rotary drive 104, and a displacement sensor 111 measures displacement X of the plunger 103. The displacement of the plunger 103 per time unit provides the flow rate of the modeling material 108, thereby allowing the control system to regulate the required amount of dispensed modeling material 108 in track 110.

As described the displacement of the plunger 103 can be obtained from a displacement sensor 111, however the skilled person may find alternatives for establishing the displacement of the plunger 103.

A torque sensor 112 can be provided to measure the torque exerted by the rotary drive 104 and transmission gear 105a, 105b to the plunger 103 and thereby to the modeling material 108. From the measured torque, a pressure exerted on the modeling material 108 in the tubular feed member 101 can be derived. The pressure can be used for pressure controlled three-dimensional modeling wherein tracks are deposited which form a contiguous layer of deposited modeling material with high density, high strength.

Alternatively, a pressure sensor may be attached to the plunger 103. The pressure sensor is arranged for measuring the pressure exerted by the plunger 103 to the modeling material 108. The plunger pressure sensor can be attached to the tip of the plunger 103 to measure the pressure exerted on the modeling material directly. The plunger pressure sensor can also be a force sensor attached to the point of engagement of the plunger 103 with the rotary drive 104 and/or transmission gear 105a, 105b. Moreover, the pressure sensor can be a strain gauge attached the plunger stem. When a pressure or force is applied to the plunger 103, this pressure or force is transferred to the modeling material 108. Due to the applied pressure or force, the plunger stem will deform, which can be measured by the strain gauge. The pressure exerted by the plunger 103 on the modeling material 108 in a higher end of the tubular feed member 101 eventually results in a pressure of the modeling material within the nozzle 102.

In the system of FIG. 3, the pressure exerted on the modeling material within the printhead 121, i.e. upper feed channel 120a and nozzle section of the feed channel 120b is determined by the plunger pressure, motor torque, drive torque, or motor current, wherein the motor current is proportional to the motor torque exerted on the drive mechanism and thereby proportional to the pressure exerted on the modeling material. The motor current can be determined using current measurement means such as current transformers or other means as will be available to the skilled person in the art.

Moreover in FIG. 4a-4c alternative ways for determining the pressure inside the upper feed channel 120a and nozzle section of the feed channel 120b will be discussed. In the system of FIG. 3, the parameter indicative of the pressure exerted on the modeling material is determined by or is proportional to the force exerted on the modeling material being deposited in track 110 at the nozzle tip 102b. While extruding by exerting a pressure on the modeling material 108 in the printhead 121, a pressure at the nozzle tip 102b is caused within the deposited track 110, which results in a force which pushes the nozzle tip 102b away from the previously deposited tracks 109.

This force is propagated from the printhead 121 via the gantry 106 and X-Y-Z positioning system 114 which is connected to the base 113 whereupon the object 122 to be modeled is placed. Alternatively, the X-Y-Z-system 114 and gantry 106 may be connected to ground. Thus the three-dimensional object 122 to be modeled can be on ground which serves as a base for the object to be printed.

The force exerted on the modeling material is thus also being propagated between the gantry 106 and the printhead 121 and can for example be measured at the connection bar 107. The connection bar 107 of the printhead 121 to the gantry 106 of FIG. 3 can for example be formed by at least one resilient connection member. A displacement sensor can measure the subsequent deformation of the resilient connection member as a measure for the force transmitted through the propagation path from the printhead 121 to the object to be created via the X-Y-Z system and base, and thereby the pressure exerted on the feed in the deposited track 110.

Figures 4A, 4B, 4C:
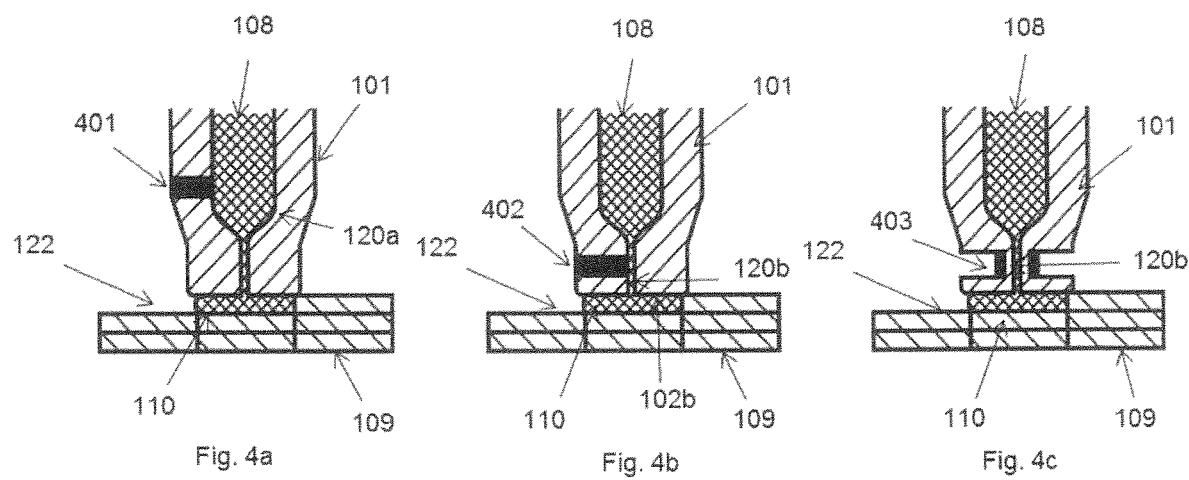
FIGS. 4a, 4b, 4c and 4d show pressure measurement arrangements for a three-dimensional modeling system according to an embodiment of the invention.

Alternatively, measurement of the force can also be achieved in a system according to FIG. 4a, wherein the connection bar 107 between the printhead 121 and gantry 106 is provided with a load cell or strain gauge 115 as shown in FIG. 3, which measures a force exerted by the printhead 121 and the track 110 being deposited relative to the gantry 106.

Moreover, the force exerted on the modeling material in the track 110 being deposited can be measured between the object and the base 113, by for example using a weight sensor, or pressure pad 116. The force thus measured is indicative for the pressure exerted on the modeling material within the layer being deposited. The pressure exerted on the modeling material within the layer being deposited is directly proportional to the measured force minus the increase of the weight of the object, which can be accurately estimated from the print settings.

As shown in FIGS. 4a-4c, alternatively to measuring the pressure exerted on the modeling material within the printhead 121, as described in relation to FIG. 3, i.e. the torque of the drive and transmission system or force at the plunger 103, a pressure exerted on the modeling material 108 within the tubular feed member 101, i.e. the upper feed channel 120a can be measured directly. The pressure measured by the pressure sensor 401 which is arranged for measuring a pressure within the upper feed channel 120a can be used for controlling the rotary drive 104 in order to obtain a pressure suitable for printing the modeling material into the track 110 to be deposited. An alternative for pressure sensor 401 is shown in FIG. 4b, wherein the pressure sensor 402 is placed within the nozzle 102 and wherein the pressure is sensed of the nozzle section of the feed channel 120b within the nozzle 102. A further alternative for measuring the pressure within the nozzle section of the feed channel 120b is to use a deformation sensor 403 such as a strain gauge of the nozzle 102 around the feed channel 120b.

Figure 4D:
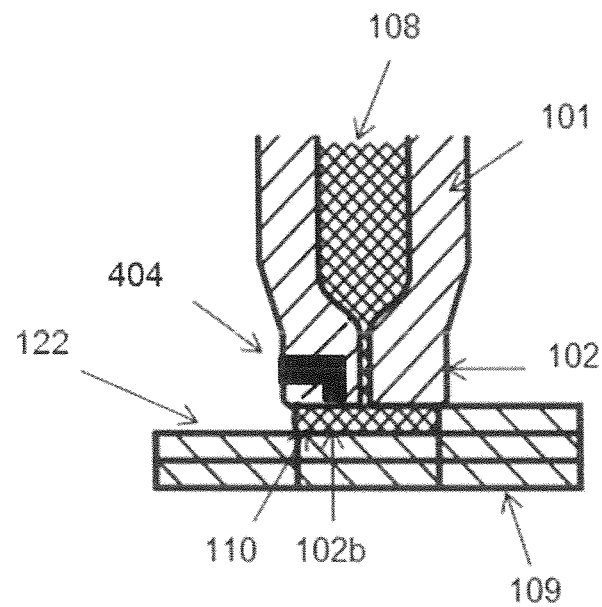

An alternative to measuring the pressure within the deposited track 110 is to have a pressure sensor 404 as shown in FIG. 4d, which is arranged within the nozzle 102 and which is fluidly connected to the nozzle tip 102. The pressure measured at the nozzle tip 102b represents the pressure exerted on the modeling material track 110.

Pressure sensors suitable for use in a three-dimensional modeling system as described above for measuring pressure within the printhead 121, comprise membrane sensors which have a deformable membrane. A liquid such as mercury may transfer the pressure within the modeling material channel wherein pressure is to be measured, i.e. the upper feed channel 120a, the nozzle section of the feed channel 120b, or at the nozzle tip 102b to the membrane. The sensor itself may be of a type including a thin film metal sensor, a conductor/strain gauge related sensor, a piezo-electric sensor, magneto-resistive sensor, laser interferometer sensor and sensor based on mechanical displacement.

Figure 5:
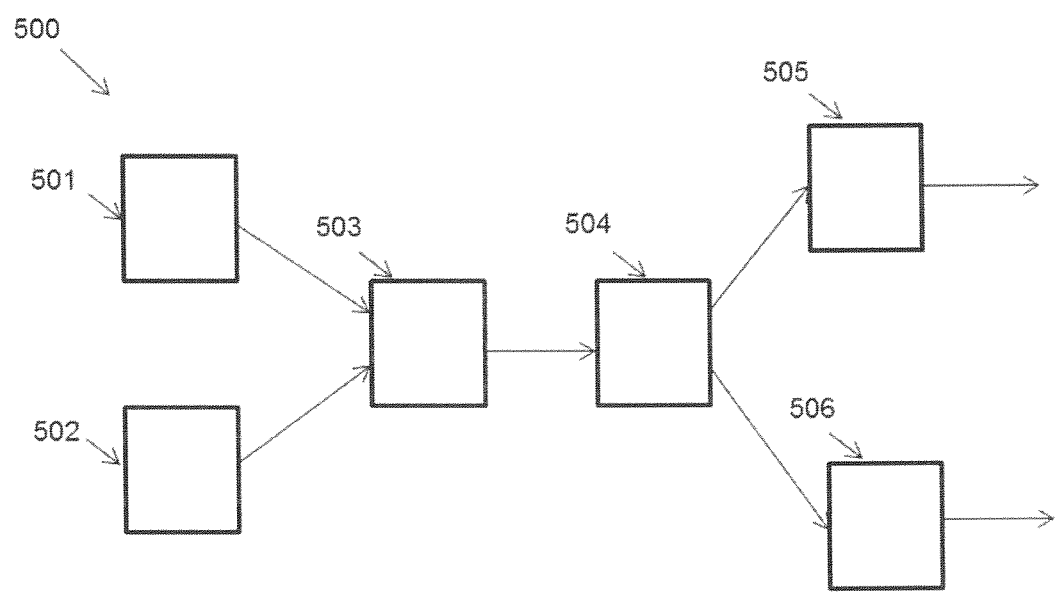
FIG. 5 shows a block diagram of a control system for three-dimensional modeling according to an embodiment of the invention.

In FIG. 5 a control system 500 is shown for establishing the parameter indicative for the fluid resistance of the nozzle 102. In functional block 501 a parameter indicative of the pressure difference between the parameters within the feed channel and outside the feed channel, i.e. in the deposited layer is established from a parameter indicative for the pressure exerted on the modeling material 108 within the upper feed channel 120a and nozzle section of the feed channel 120b and a parameter indicative for the pressure exerted on the modeling material outside the nozzle. The parameter indicative of the pressure difference between the parameters within the feed channel is derived or measured such as described above, i.e. torque, motor current. The parameter indicative of the pressure outside the feed channel, i.e. in the deposited layer, is determined as described above.

In functional block 502, a parameter indicative of the flow rate of modeling material is established as described above.

In functional block 503 the ratio between the parameter indicative of the pressure difference and the parameter indicative for the flow rate to establish the parameter indicative of the fluid resistance of the nozzle 102 is calculated.

In functional block 504, the parameter indicative of the fluid resistance of the nozzle is compared against thresholds which define a range. When the parameter indicative of the fluid resistance of the nozzle exceeds an upper limit, in functional block 505 a signal may be generated indicative of a too high fluid resistance caused by probable fouling. This may cause an alarm involving an audible or visual indication to be generated. Furthermore, when the three-dimensional modeling system is equipped with a purge location, the control system may be arranged to move the printhead 121 to the purge location and purge, i.e. empty the feed channel, thereby disposing of fouling and debris present within the feed channel 120b or nozzle outlet 102a. The purging may be performed under suitable temperature conditions for optimally disposing of the modeling material or a dedicated purge material can be used to clean the upper feed channel 120a and nozzle section of the feed channel 120b inside of the tubular feed member 101 and nozzle 102.

When the parameter indicative of the fluid resistance of the nozzle is below a lower limit, in functional block 506 another signal may be generated indicative of a too low fluid resistance caused by probable wear of the nozzle outlet. This may also cause an appropriate alarm involving an audible or visual indication to be generated. Furthermore, when the three-dimensional modeling system is equipped with a means for mechanically replacing nozzles or printhead 121, the control system may be arranged to initiate a change of nozzle 102 and/or printhead 121.

The control system may comprise a programmable logic controller (PLC), a microcontroller or processor having a memory (RAM, ROM, EPROM, etc) comprising program instructions, which in operation cause the processor to perform the functional blocks 501-506 as described. The pressure sensors and force sensors as described are connected to the control system where the measured pressures, forces and displacements may be acquired as is well established in the art.

Figure 6:
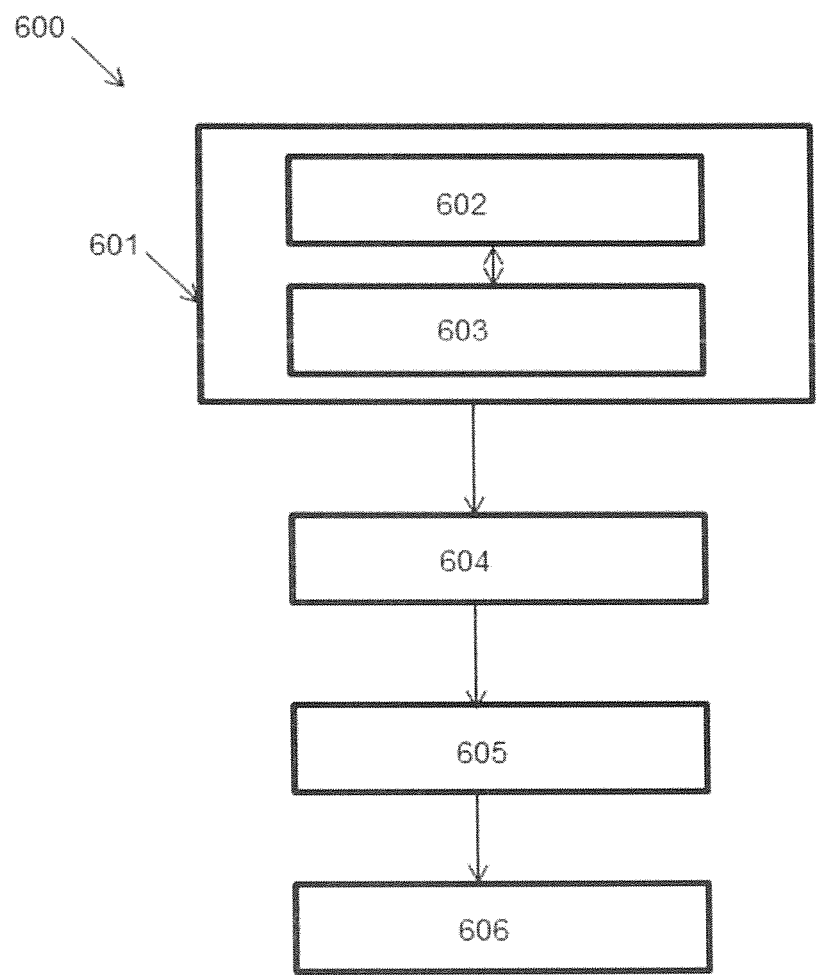
FIG. 6 shows steps of a method for three-dimensional modeling according to an embodiment of the invention.

In FIG. 6 a flow diagram 600 is shown indicating the method for three-dimensional modeling a three-dimensional object, having the steps of three-dimensional modeling the object 601, which comprises positioning the printhead 602, feeding the modeling material 603 and depositing the modeling material, determining the parameter indicative of the fluid resistance of the nozzle 604, comparing 605 the parameter with threshold pressure values in a range, generating a signal when the parameter is out of the range 606.

The steps of positioning the printhead 602, feeding and despositing the modeling material 603, are performed simultaneously, wherein the printhead is initially moved over the base on which the object is to be printed, and thereafter on previously deposited layers 109 as shown in FIG. 3. The feeding of modeling material subsequently results in depositing the modeling material initially on the previously deposited layers 109. These steps, and the pattern by which the printhead 121 is moved and the amounts of deposited modeling material, layer thickness together result in the three-dimensional modeling of the three-dimensional object. The patterns and layer thicknesses can be derived by the control system from a three-dimensional model which can be provided electronically to the control system.

The parameter indicative of the fluid resistance of the nozzle can be calculated from the pressure difference over the nozzle as described above.

In step 602 tracks of deposited modeling material are formed, making up the three-dimensional object 122 to be created. Depending on the parameter indicating the fluid resistance of the nozzle, the deposited tracks center line may be shifted. When for example the resistance is low due to dilation of the nozzle outlet, the tracks tend to be broader when printing or depositing with constant flow rate. Thus, the tracks center lines may be spaced apart further away than normal allowing the object to be modeled according to specification.

Alternatively, when using pressure-controlled printing, the pressure setpoint may be set at a lower level allowing the width of the deposited tracks to be within specification.

When using flow-controlled printing, at low fluid resistance, the flow rate setpoint may be set at a level depending on the fluid resistance of the nozzle allowing the track width to be within specification.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS

100 Three-dimensional modeling system
101 Tubular feed member
102 Nozzle
102*a* Nozzle outlet
102*b* Nozzle tip
103 Plunger
104 Rotary drive
105*a*, Transmission gear
105*b*
106 Gantry
107 Connection bar
108 Modeling material
108*a* Solid modeling material
108*b* Molten modeling material
108*c* Molten modeling material level
109 Previously deposited tracks
110 Deposited track
111 Displacement sensor
112 Torque sensor
113 Base
114 X-Y-Z positioning system
115 Load cell or strain gauge
116 Weight sensor, or pressure pad
120*a* Feed channel
120*b* Nozzle section of the feed channel
121 Printhead
122 Three-dimensional object
401-404 Pressure sensor
500 Control system
501 Establish pressure difference
502 Establish flow rate
503 Calculator for calculating parameter indicative of the fluid resistance
504 Comparator for comparing parameter with threshold values
505 Signal generator
506 Signal generator
600 Method of 3D modeling
601 Three-dimensional modeling
602 Positioning the printhead
603 Feeding the modeling material
604 Determining the parameter indicative of the fluid resistance of the nozzle
605 Comparing the parameter with a pressure range
606 Generating a signal when the parameter is out of the range

What is claimed is:

1. A method for generating a signal indicative for nozzle maintenance, comprising:
    feeding modeling material using feeding means through a feed channel of a printhead to a nozzle of the printhead in a three-dimensional modeling system;
    determining a parameter indicative of a fluid resistance of modeling material within said nozzle, comprising
        determining a flowrate of the modeling material within the feed channel;

determining a pressure exerted on the modeling material within the feed channel and determining a pressure exerted on the modeling material outside the feed channel;
determining a pressure difference between the pressure exerted on the modeling material within the feed channel and the pressure exerted on the modeling material outside the feed channel; and
calculating said parameter from the determined flow rate and the determined pressure difference;
comparing said parameter with a predetermined range; and
generating said signal if said parameter is out of the predetermined range.

2. The method according to claim 1, wherein the comparing the parameter with the predetermined range comprises: comparing the parameter with a first predetermined threshold value; and wherein the generating said signal if the parameter indicative of the fluid resistance is out of the predetermined range comprises: generating a first signal if the parameter is greater than or equal to the first predetermined threshold value.

3. The method according to claim 1, wherein the comparing the parameter with a predetermined range comprises:
comparing the parameter to a second predetermined threshold value; and
wherein the generating said signal if the parameter indicative of the fluid resistance is out of the predetermined range comprises:
generating a second signal if the parameter is less than or equal to the second predetermined threshold value.

4. The method according to claim 1, wherein the determining a pressure exerted on the modeling material within the feed channel comprises
using a first pressure sensor for determining a pressure exerted on the modeling material by the feeding means; or
using a second pressure sensor connected to the feed channel near the nozzle.

5. The method according to claim 1, wherein the determining a pressure exerted on the modeling material within the feed channel comprises measuring a drive force in one of a rotary drive and a transmission system; or
wherein the drive force can be measured using a torque sensor configured and arranged between any one of the rotary drive and the transmission system and an actuator; or
wherein the rotary drive comprises an electric motor and wherein the drive force can be measured by measuring a current supplied to the electric motor.

6. The method according to claim 1, wherein the determining a pressure exerted on the modeling material outside the feed channel comprises:
assigning an atmospheric pressure value to the pressure exerted on the modeling material outside the feed channel; or
determining a pressure exerted on the modeling material at a tip of the nozzle.

7. The method according to claim 6, wherein the determining a pressure exerted on the modeling material at a tip of the nozzle comprises:
measuring a force between the nozzle and a base for placing an object to be modeled; or
wherein the measuring a force between the nozzle and a base for placing the object to be modeled comprises:
using a force sensor in at least one location from a group of locations comprising: a connection between the printhead and a three-dimensional positioning system for positioning the printhead relative to the base, a connection of the base to the three-dimensional positioning system, a location between the base and ground, and a location between the base and the object to be printed.

8. The method according to claim 1, wherein the determining a flow rate of the modeling material within the feed channel comprises:
determining a displacement of the modeling material within the feed channel; or
wherein the determining a displacement of the modeling material within the feed channel comprises:
determining a displacement of the feeding means for feeding the modeling material through the feed channel; or
further comprising
initiating a sequence for replacing at least one of the nozzle and the printhead upon generating said signal indicative for nozzle maintenance.

9. A method of purging a printhead in a three-dimensional modeling system in a method of three-dimensionally modeling a three-dimensional object, comprising:
moving the printhead to a purge location;
purging a feed channel of the printhead;
performing the steps of the method for generating a signal indicative for nozzle maintenance in accordance with claim 1; and
wherein the purge location is within a build chamber of the three-dimensional modeling system.

10. A method for three-dimensionally modeling a three-dimensional object comprising:
three-dimensionally positioning a printhead connected to a three-dimensional positioning system of a three-dimensional modeling system;
depositing modeling material using the printhead;
performing the steps of the method for generating a signal indicative for nozzle maintenance in accordance with claim 1; and further comprising:
controlling at least one of feeding of the modeling material within the printhead and positioning of the printhead depending on at least one of the pressure exerted on the modeling material within the feed channel, the pressure exerted on the modeling material outside the feed channel and the flow rate of the modeling material within the feed channel;
adapting the controlling of at least one of the feeding of the modeling material within the printhead and positioning of the printhead in accordance with the parameter indicative of the fluid resistance of the modeling material within the nozzle of the printhead.

11. A system for three-dimensionally modeling a three-dimensional object, comprising:
a three-dimensional positioning system;
a printhead connected to the three-dimensional positioning system;
feeding means for feeding modeling material through a feed channel of the printhead to a nozzle;
means for determining a parameter indicative of a fluid resistance of modeling material within a nozzle of the printhead, wherein the means for determining a fluid resistance of the modeling material within the nozzle comprise:
flow determining means for determining a flowrate of the modeling material within the feed channel;
first pressure determining means for determining a pressure exerted on the modeling material within the feed channel and second pressure determining means for determining a pressure exerted on the modeling material outside the feed channel;

processing means, wherein the processing means are configured and arranged for:

determining a pressure difference between the pressure exerted on the modeling material within the feed channel and the pressure exerted on the modeling material outside the feed channel;

calculating the parameter indicative of the fluid resistance of the modeling material from the determined flow rate and the determined pressure difference;

a comparator for comparing said parameter with a predetermined range;

a generator for generating a signal indicative for nozzle maintenance if the parameter indicative of the fluid resistance is out of the predetermined range.

12. The system according to claim 11, wherein the comparator is arranged for comparing the parameter with a first predetermined threshold value; and wherein the generator is arranged for generating a first signal if the parameter is greater than or equal to the first predetermined threshold value; or wherein the comparator is arranged for comparing the parameter to a second predetermined threshold value; and wherein the generator is arranged for generating a second signal if the parameter is less than or equal to the second predetermined threshold value.

13. The system according to claim 11, wherein the first pressure determining means comprise a first pressure sensor for determining a pressure exerted by the feeding means on the modeling material; or wherein the first pressure determining means comprise a second pressure sensor connected to the feed channel near the nozzle.

14. The system according to claim 11, wherein the first pressure determining means for determining a pressure exerted on the modeling material within the feed channel comprises means for measuring a drive force in any one of a rotary drive and a transmission system; or wherein the means for measuring a drive force in one of the drive and transmission system comprise a torque sensor configured and arranged between any one of the rotary drive and the transmission system and an actuator; or wherein the rotary drive comprises an electric motor, and wherein the means for measuring a drive force in one of the drive and transmission system comprise a current sensor for measuring a current supplied to the electric motor.

15. The system according to claim 11, wherein said second pressure determining means comprise means for assigning an atmospheric pressure value to said pressure exerted on the modeling material outside the feed channel.

16. The system according to claim 11, wherein the second pressure determining means comprise a third pressure sensor for determining a pressure exerted on the modeling material at a tip of the nozzle; or wherein the third pressure sensor comprises a force sensor arranged between the nozzle and a base for placing the three-dimensional object to be modeled; or wherein the force sensor is arranged in at least one location from a group of locations comprising: a connection between the printhead and the three-dimensional positioning system for positioning the printhead relative to the base, a connection of the base to the three-dimensional positioning system, a location between the base and ground, and a location between the base and the object to be printed.

17. The system according to claim 11, wherein the flow determining means are arranged for determining a displacement of the modeling material within the feed channel; or wherein the flow determining means comprise a displacement sensor connected to the feeding means for feeding the modeling material through the feed channel.

18. The system according to claim 11, further comprising a purge location, and positioning means that are configured and arranged for moving the printhead to said purge location if the parameter is greater than or equal to the first predetermined threshold value; and wherein the printhead is arranged for purging the feed channel; or wherein the system further comprises a built chamber in which the three-dimensional object to be created can be accommodated, wherein the purge location is configured and arranged within the built chamber.

19. The system according to claim 18, wherein the positioning means are arranged for initiating a sequence for replacing at least one of the nozzle and the printhead upon generating said signal indicative for nozzle maintenance.

20. The system according to claim 18, wherein the system further comprises a control system, wherein the control system is configured and arranged for controlling at least one of the feeding means and positioning means depending on at least one of the pressure exerted on the modeling material within the feed channel, the pressure exerted on the modeling material outside the feed channel and the flow rate of the modeling material within the feed channel;

adapting the controlling of at least one of the feeding means and positioning means in accordance with the parameter indicative of the fluid resistance of the modeling material within the nozzle of the printhead.

* * * * *